(12) United States Patent
Davis et al.

(10) Patent No.: US 9,507,558 B2
(45) Date of Patent: Nov. 29, 2016

(54) SYSTEMS AND METHODS FOR SHARED DISPLAY IN A HYBRID ENVIRONMENT

(75) Inventors: Mark C. Davis, Durham, NC (US); Chen Hao, Beijing (CN); Jin Yuru, Guangdong Province (CN); Chen Xingwen, Shenzhen (CN); Michael T. Vanover, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 914 days.

(21) Appl. No.: 12/978,538

(22) Filed: Dec. 24, 2010

(65) Prior Publication Data
US 2012/0162058 A1 Jun. 28, 2012

(51) Int. Cl.
G09G 5/00 (2006.01)
G06F 3/14 (2006.01)

(52) U.S. Cl.
CPC ......... *G06F 3/1438* (2013.01); *G09G 2354/00* (2013.01); *G09G 2370/16* (2013.01)

(58) Field of Classification Search
USPC .................................................. 345/156–178
See application file for complete search history.

(56) References Cited

U.S. PATENT DOCUMENTS 6,362,440 B1* 3/2002 Karidis et al. ............. 178/18.01
2003/0112585 A1* 6/2003 Silvester ....................... 361/679

* cited by examiner

*Primary Examiner* — Carolyn R Edwards
(74) *Attorney, Agent, or Firm* — Ference & Associates LLC (57) ABSTRACT

Embodiments operating shared peripherals in a hybrid computing system are described. Embodiments control one or more shared peripheral devices variously between a primary system and a secondary system via one or more communication links, where the secondary system is detachable from the primary system and operates as an independent computing device in the disconnected state, while operating as a display device in the connected state.

20 Claims, 5 Drawing Sheets

SYSTEMS AND METHODS FOR SHARED DISPLAY IN A HYBRID ENVIRONMENT

BACKGROUND

The number and diversity of portable electronic devices are proliferating. In addition to established technologies, such as the laptop computer, many new devices constantly enter the marketplace, with a limited number eventually becoming popular with users. A recent example of a device whose use is becoming increasingly prevalent is the tablet (also referred to as a slate) computer. Although multiple forms exist, tablet computers generally consist of a medium sized display screen (for example, 7 to 10 inches) with a touch interface. Instead of receiving input through the customary keyboard and mouse input devices, primary methods for tablet device input involve interacting with the touch interface through a stylus or touch gestures.

Notwithstanding the popularity of new computing devices, such as tablet computers, the conventional clamshell laptop computer remains the standard portable computing device for a vast majority of users. Examples of clamshell laptop computer include the IDEAPAD series of personal computers sold by Lenovo (US) Inc. of Morrisville, N.C. IDEAPAD is a trademark of Lenovo in the United States, other countries, or both.

Tablet and laptop computers each have advantages. Advantages for tablet computers include for example mobility and size, while advantages of laptop computers include for example increased processing power and battery life.

BRIEF SUMMARY

In summary, one aspect of the invention provides a system comprising: a base device having one or more processors therein, the base device having a first operating system; and a display device having one or more processors and one or more shared peripheral devices therein, the display device being detachably connected to the base device, the display device having a second operating system; and a connector configured to provide one or more communication links between the base device and the display device; wherein control of the one or more shared peripheral devices is switched from the display device to the base device responsive to connecting the display device to the base device.

Another aspect of the invention provides a method comprising: sharing one or more peripheral devices between: a base device having one or more processors and a first operating system; and a display device having one or more processors, the one or more shared peripheral devices, and a second operating system; communicating information between the base device and the display device via one or more communication links; and switching control of the one or more shared peripheral devices from the display device to the base device responsive to connecting the display device to the base device.

A further aspect of the invention provides a computer program product comprising: a computer readable storage medium having computer readable program code embodied therewith, the computer readable program code comprising: computer readable program code configured to share one or more peripheral devices between: a base device having one or more processors and a first operating system; and a display device having one or more processors, the one or more shared peripheral devices, and a second operating system; computer readable program code configured to communicate information between the base device and the display device via one or more communication links; and computer readable program code configured to switch control of the one or more shared peripheral devices from the display device to the base device responsive to connecting the display device to the base device.

The foregoing is a summary. For a better understanding of example embodiments, together with other and further features and advantages thereof, reference is made to the following description, taken in conjunction with the accompanying drawings, and the scope of the claimed embodiments will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obscuring aspects of the invention.

Tablet computers and laptop computers are different on many levels. The external structure of a clamshell laptop computer consists of two main components: a lower base portion and an upper display portion. The lower base portion provides a housing for laptop hardware components, including one or more processors, a motherboard, memory, a keyboard, pointing device(s) and the like. The upper display portion comprises a housing for the laptop display screen and other components, such as a camera, a wireless antenna and the like. The lower base portion and upper display portion are hingedly connected to allow for opening and closing the laptop computer.

Structurally, a tablet computer (also referred to as a slate) is generally smaller and more lightweight than a laptop computer, consisting of a single portion. Tablet computers integrate the display, typically lack a physical keyboard, utilize a touch screen as an input device, and are generally smaller than clamshell laptops. For example, typical tablet computers are comprised of 7 to 10 inch displays, while the typical laptop computer display is 10 to 17 inches.

In addition to structural and operational differences, tablet and laptop computers also differ with respect to their internal software and hardware configurations. The typical laptop computer includes a Win-Tel platform, comprised of an Intel x86 compatible processor and is capable of running a Microsoft WINDOWS operating system, such as WINDOWS 7 operating system.

In comparison, tablet computers are most likely to run on lower powered processors and lighter weight operating systems specially designed for smaller devices. The lighter weight operating systems are often termed 'mobile operating systems' and are optimized for touch and content consumption instead of running larger applications, such as the full version of Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 and WORD are registered trademarks of Microsoft Corp. in the United States and/or other countries. ANDROID is a registered trademark of Google Inc. in the United States and/or other countries. SNAPDRAGON BY QUALCOMM is a registered trademark of Qualcomm Inc. in the United States and/or other countries.

Tablet and laptop computers each have their own set of advantages. Advantages for tablet computers include mobility, size, weight, and increased ease of use for certain functions. While primary reasons for preferring laptop computers are increased processing power and battery life, wider choice of operating systems and applications, and the presence of the standard keyboard and touch input devices. As such, it would be advantageous to provide a form factor that includes the functionality and features of both a laptop computer and a tablet computer in one single device.

Embodiments provide for a hybrid computing system consisting of a base device/component operably connected/coupled to a detachable/de-coupled display device/component, wherein the display component includes the functionality of a tablet computing device. According to embodiments, the base component includes the lower base of a clamshell laptop computing system, additionally having one or more interfaces (such as a physical docking or connector) for connecting to the display component. Embodiments provide that the display component includes a tablet computing device with one or more complementary interfaces (such as a complementary physical docking or connector) for connecting to the base component. According to embodiments, the display component may function as the display screen of the hybrid computing system when attached to the base component, and function as an independent tablet computer when not attached to the base component.

Figure 1:
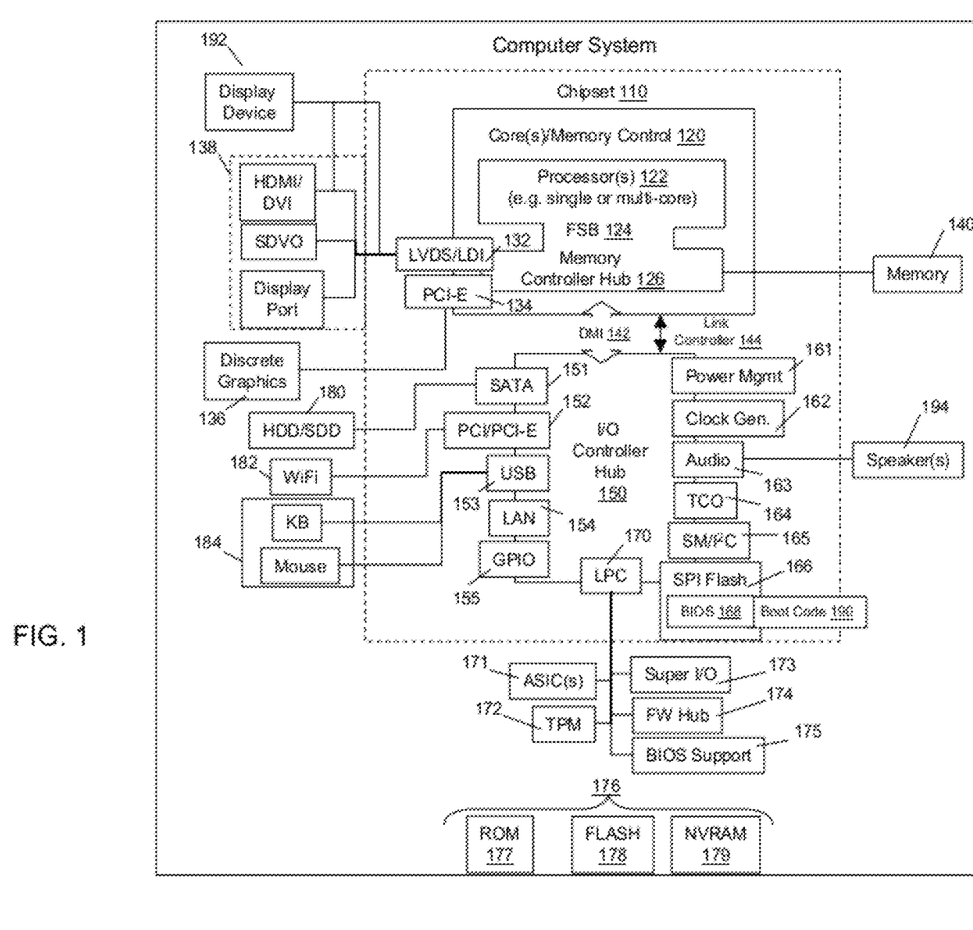
FIG. 1 illustrates an example circuitry of a hybrid computer system.

The base component of hybrid computer system and the display component of hybrid computer system comprise various circuitry. While various other circuits or circuitry may be utilized, FIG. 1 depicts a block diagram of one example of a computer system and circuitry. For example, the circuitry depicted in FIG. 1 may be a circuitry included in base component of hybrid computing system, which may correspond to circuitry included in the IDEAPAD series of personal computers sold by Lenovo (US) Inc. of Morrisville, N.C. However, as is apparent from the description herein, components of the embodiments may include other features or only some of the features of the example system illustrated in FIG. 1.

The computer system of FIG. 1 includes a so-called chipset 110 (a group of integrated circuits, or chips, that work together, chipsets) with an architecture that may vary depending on manufacturer (for example, INTEL®, AMD®, ARM® etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, et cetera), a PCI-E interface 152 (for example, for wireless connections 182), a USB interface 153 (for example, for input devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

For example, with regard to the display device/tablet circuitry, an example includes an ARM based system (system on a chip) design. Internal busses and the like depend on different vendors, but essentially all the peripheral devices may attach to a single chip. In contrast to the circuitry illustrated in FIG. 1, the tablet circuitry combines the processor, memory control, and I/O controller hub all into a single chip. Also, ARM based systems do not typically use SATA or PCI or LPC. Common interfaces for example include SDIO and I2C. There are power management chips, and in the at least one embodiment, a single chip is used to supply BIOS like functionality and DRAM memory.

Figure 2:
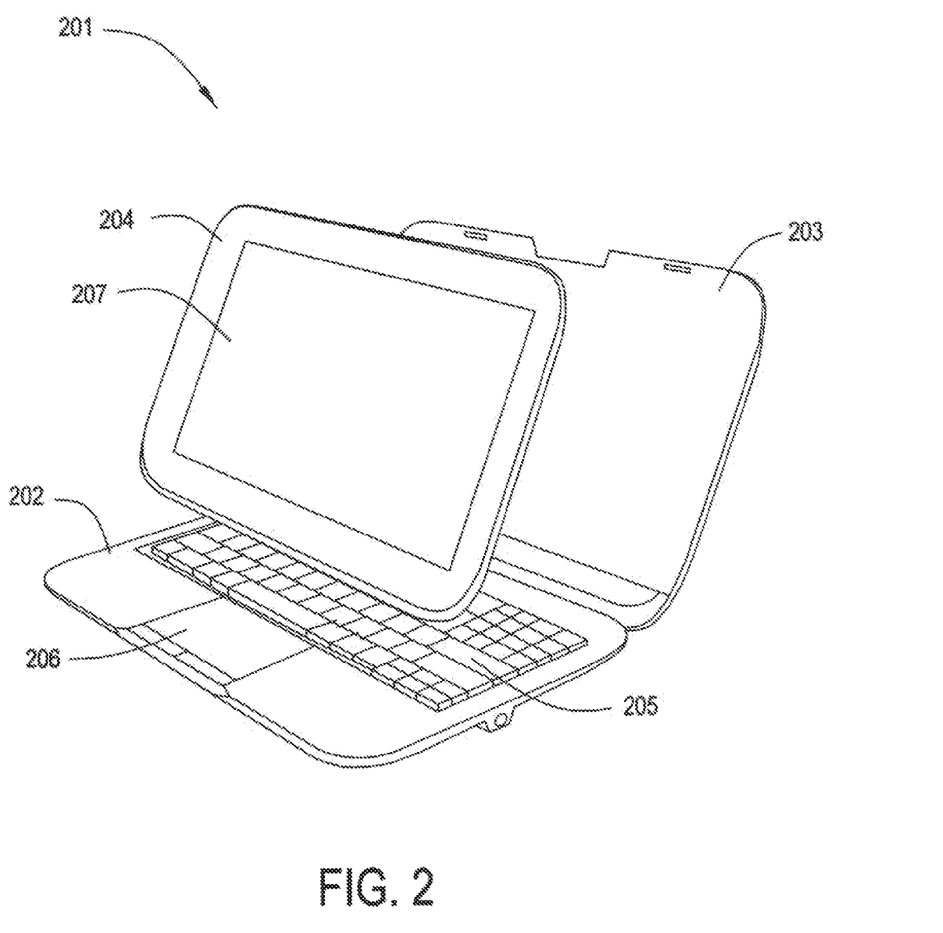
FIG. 2 illustrates an example hybrid computer system.

Referring to FIG. 2, therein is depicted an illustration of a hybrid computing system according to an embodiment. The hybrid computing system 201 includes a base device 202 and a display device/component 203. The base device 202 consists for example of a laptop circuitry such as described in connection with FIG. 1 and optionally a back plate 203 is included for supporting the display device 204 when connected to the base 202. The base device 202 itself has a physical keyboard 205, a touch pad 206, and a base connector element for connecting with the display component connector element. For its part, display device 204 is, for example, a detachable tablet and thus includes a touch screen interface 207, a light weight operating system, one or more processors, and other peripheral devices.

Figure 3:
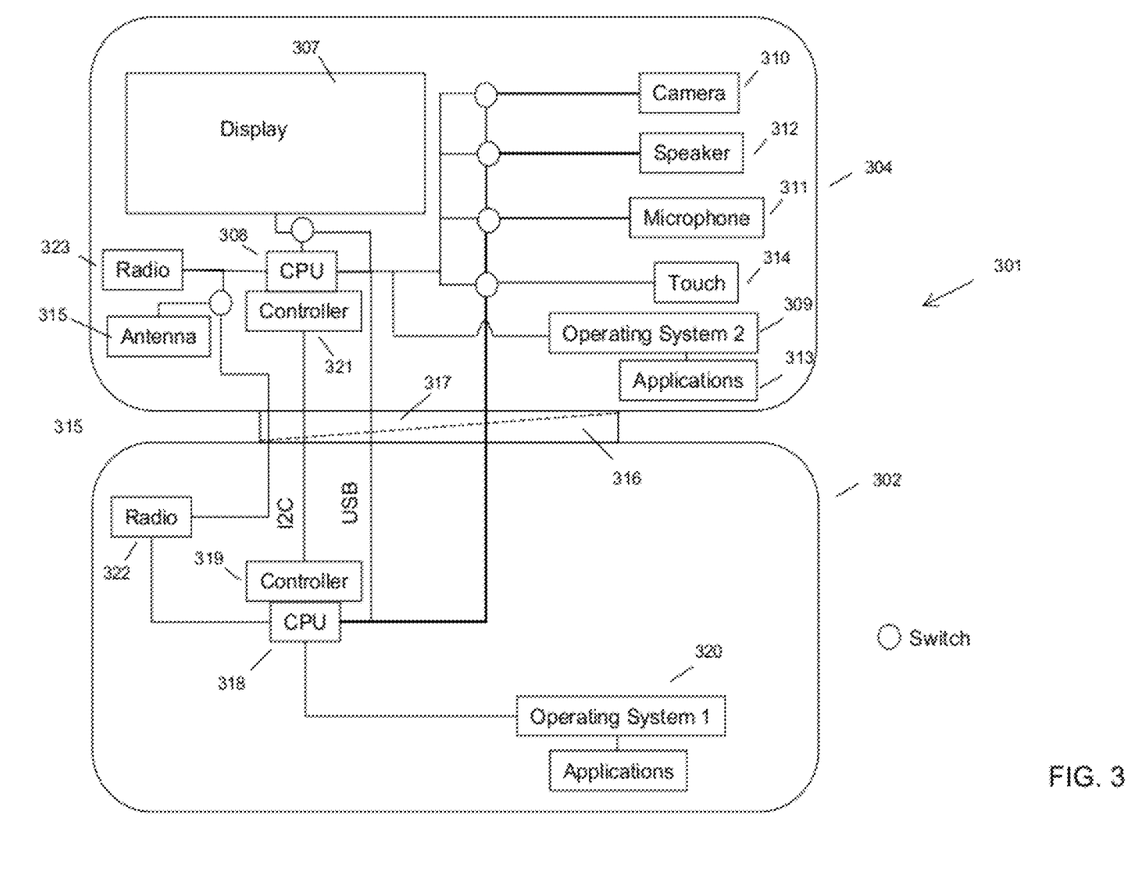
FIG. 3 illustrates an example hybrid computer system.

FIG. 3 provides an illustration of an example embodiment of a hybrid computing system. The hybrid computer system 301 has at least two states. For example, the hybrid computer system includes a connected state when the tablet 304 is connected to the base 302, and a disconnected state when the tablet 304 is not connected to the base 302.

When the hybrid computer system 301 is in the disconnected state, the tablet 304 operates as an independent tablet computer. As such, the tablet CPU 308 and the tablet operating system 309 control the operation of the tablet 304, including the display screen 307, peripherals such as a camera 310, microphone 311, speaker 312, shared wireless antenna 315, accelerometer (not shown), SD card (not shown), other similar peripheral devices, and tablet software applications 313. In the disconnected state, the tablet 304 uses the touch interface module 314 for user interaction through combined display and touch screen, and the shared wireless antenna 315 for network communications.

The hybrid computer system 301 assumes the connected state when the tablet 304 and the base 302 are connected, as for example through their respective connector elements 316, 317. In the example embodiment illustrated in FIG. 3, the connector elements include USB and I2C connections, as well as a power connection for charging tablet 304 battery (not shown) while it is connected to the base 302.

When in the connected state, the tablet and its peripherals are controlled by the base CPU 318, base controller 319, and base operating system 320. Essentially, the tablet 304 becomes a display device for the hybrid computer system 301 similar to the display component of a conventional laptop computer. As such, the tablet CPU 308 and tablet operating system 309 do not control, via controller 321, peripherals, when the hybrid computer system 301 is in the connected state, though the tablet operating system may be running in the connected state.

The base CPU 318, base controller 319, and base operating system 320 control the display screen 307 and peripherals located in the tablet 304. The base power system (not shown) charges the battery (not shown) located in the base 302 regardless of the connection state of the hybrid computer system 301. However, when the hybrid computer system is in the connected state, the base power system also charges the slate battery via a power connection element, which may be collocated with base connector element 316 and display connector element 317.

In a coupled environment, there are two computing systems, that is a primary system (base device 302), and a secondary system (display device 304 taking the form of a tablet). These systems share access to various peripheral devices and/or internal components, depending on the state (connected or disconnected). Each system is capable of operating independently.

In coordinating the primary and secondary systems in terms of controlling and operating peripheral devices, one function is to ensure adequate communication between the systems is established. The base device controls tablet and peripheral devices thereof in the connected state. However, responsive to disconnection, table acts independently and assumes controls of peripheral devices such that it operates as a tablet computing device.

In order to coordinate control of peripheral devises between the primary and secondary system, embodiments provide systems and methods to ensure adequate communication. Communication takes place via a connection, which may be physical (wired) or wireless, and communications are exchanged according to one or more communication protocols.

The tablet 304 is a thin device with a display 307 and touch interface 314, with a few other connectors or buttons. A connector 317 on the tablet allows attaching it to the base device dock 316. Switching electronics ("switches" in FIG. 3) in the tablet 304 permit the display 307, touch interface 314, camera 310, microphone 311 and similar peripherals on the tablet 304 to be used by the base device 302 while the tablet 304 is attached. Power from the AC power supply attached to the base device 302 or power from the battery in the base device 302 can be used to charge the battery in the tablet 304.

Communications between the base 302 and the tablet 304 preferably take place at two levels. Control of machine-state, security and other hardware related functions is provided by communications between an embedded controller 318 in the base device 302 and controller 321 on the tablet 304. This communication link may use protocols like I2C or LPC. At a second level, higher bandwidth communications between the CPU 318 in the base device 302 and the CPU 308 in the tablet 304 can be used to move large amounts of data, such as video files. This link may use methods like USB, PCI express or ethernet.

The connector 316, 317 between the tablet 302 and base 304 thus may include power connection, low speed communications, and high speed communications for data and peripheral devices. The connector 316, 317, along with other mechanical strengthening components such as a back plate 203 or socket support the tablet 302 when attached and allow operation as a clamshell type computer.

Figure 4:
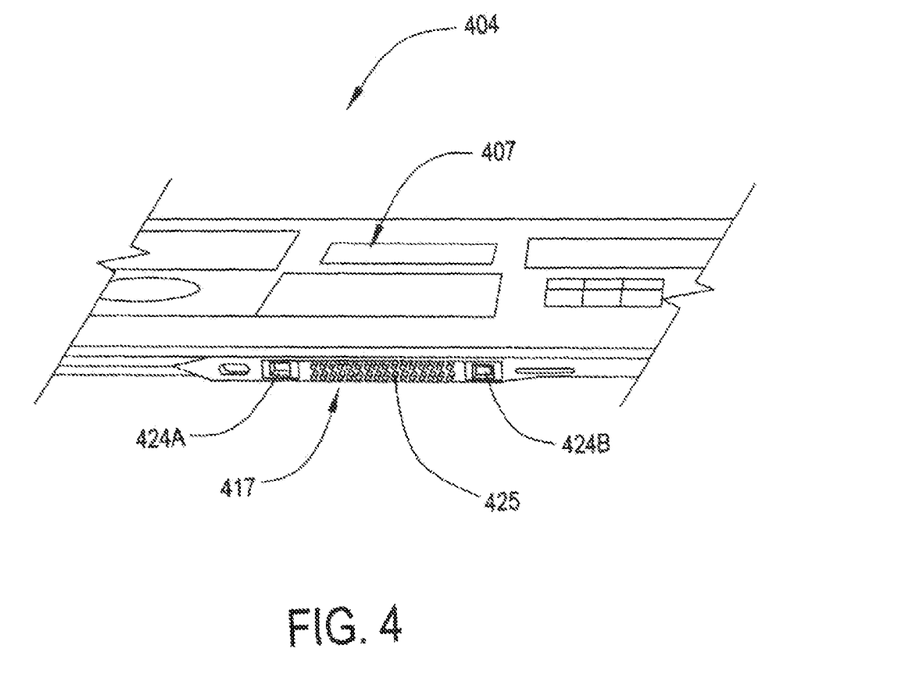
FIG. 4 illustrates an example connection on display device.

FIG. 4 illustrates an example connector element 417 on display device (tablet) 404. Tablet 404 includes a physical connector element 417 that includes inlets 424A, 424B for permitting insertion of mechanical strengthening components on complementary connector element of the base device. Furthermore, connector element 417 includes electrical connection portion 425 that supports communication links, for example between controllers of base device and tablet 404, as well as power connection(s), such as for charging battery of tablet 404. Tablet in disconnected state operates independently, including combined display/touch screen interface 407.

Figure 5:
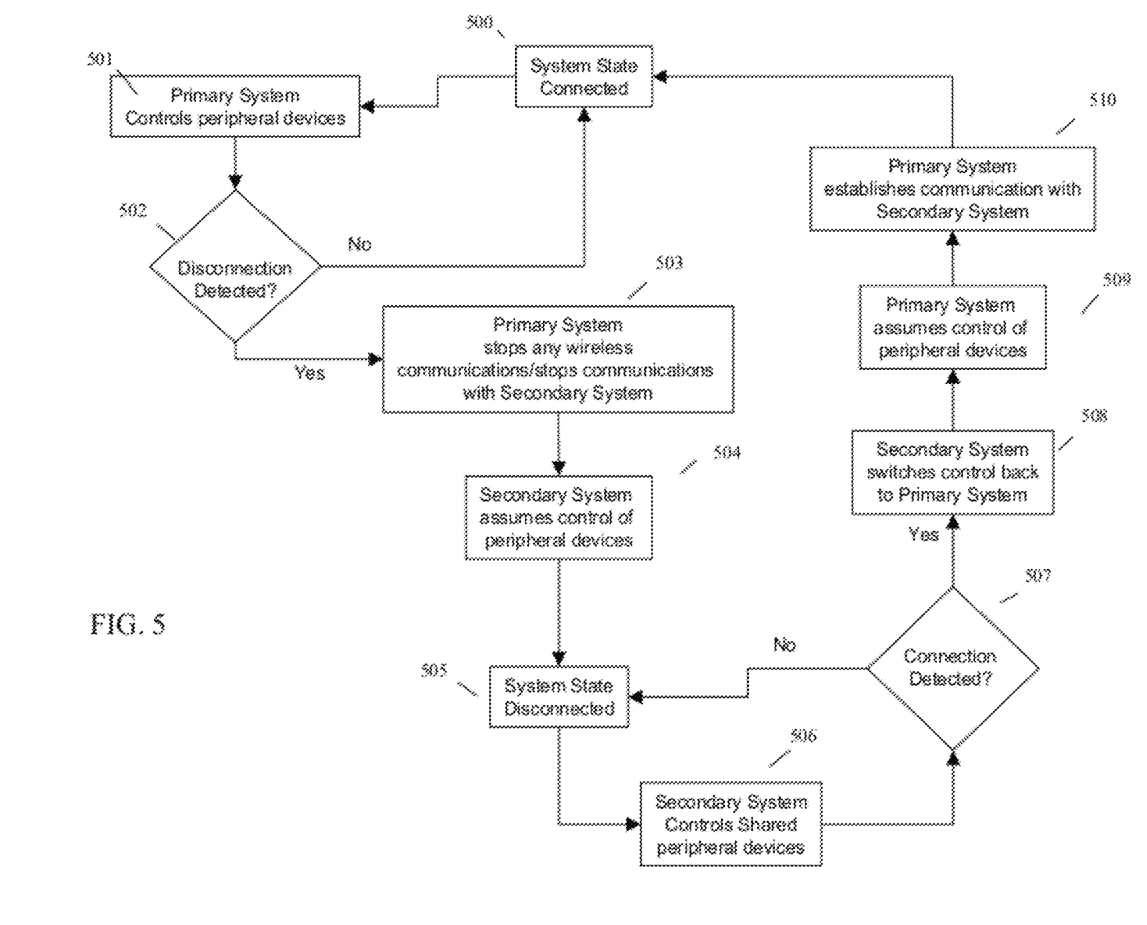
FIG. 5 illustrates an example of peripheral sharing.

Referring now to FIG. 5, an example method for peripheral device sharing is illustrated. Starting at 500, from a hybrid configuration in which the primary system (base device) and secondary system (tablet) are connected, the primary (base) system controls 501 the peripheral devices located in the tablet. Secondary system contains a shared peripheral devices, which primary system accesses and controls via connection and controller. The secondary system's operating system is up and running; however primary system's operating system controls the shared peripherals.

Responsive to disconnecting 502, as for example physically disconnecting the secondary system from a docking connection, the primary system stops any wireless communications and further stops communications with the secondary system 503. The secondary system's operating system detects a signal that the secondary system has been disconnected and then assumes control of the shared peripheral devices 504 via switches. The secondary system, while in disconnected state 505, controls peripherals such as a shared wireless antenna, transmits and receives data, and operates independently.

Responsive to detecting connection 507, according to an embodiment, by policy secondary system passes control to primary system 508, and secondary system assumes a reduced power mode (sleep mode). For example, secondary system powers down its radio and operates switches to pass control to primary system. Primary system may now assume control of the shared peripheral devices 509. In switching control between systems, the secondary system processor can control the switches and signal to primary system operating system that control of shared peripherals is being passed back to primary system, or alternatively, primary system controls the switches, and may detect connection and instruct secondary system to pass control back to primary system. Responsive to primary system assuming control of shared peripheral devices, primary system establishes (or re-establishes) communications with secondary system 510 and system connected state 500 is established.

In re-establishing connected state 500, secondary system may transmit, for example using high-bandwidth communications protocol, any necessary data (such as data downloaded or produced during disconnected state) to primary system. Providing such data or information from secondary system to primary system ensures a seamless transition or continuity of experience when re-establishing the connected state. As such, a user can continue working on hybrid system responsive to reconnection of tablet to base device.

Embodiments may be implemented in one or more computing devices configured appropriately to execute program instructions consistent with the functionality of the embodiments of the invention as described herein. In this regard, FIG. 1 describes a non-limiting example of such a computing device. As will be appreciated by one skilled in the art, various aspects may be embodied as a system, method or computer program product. Accordingly, aspects may take the form of an entirely hardware embodiment or an embodiment including software and/or hardware aspects that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying drawings, it is to be understood that this description is not limiting and that various other changes and modifications may be affected therein by one skilled in the art without departing from the scope or spirit of the disclosure.

What is claimed is:

1. A system comprising:
   a base device having one or more processors therein, the base device having a first operating system; and
   a display device having one or more processors and one or more shared peripheral devices therein, the display device being detachably connected to the base device, the display device having a second operating system; and
   a connector providing one or more communication links between the base device and the display device;
   wherein control of the one or more shared peripheral devices is switched from the display device to the base device responsive to connecting the display device to the base device; and
   wherein the one or more communication links comprise a wired connection providing: a low level communication link transmitting control communications between a controller in the base device and a controller in the display device; and a higher bandwidth communication link transmitting media file data between a processor of the base device and a processor of the display device.

2. The system according to claim 1, wherein the low level communication link operates using a first communication protocol.

3. The system according to claim 1, wherein the higher bandwidth communication link operates using a second communication protocol.

4. The system according to claim 1, wherein the one or more shared peripheral devices comprise one or more of: a camera, a display, a microphone, a speaker and a wireless antenna.

5. The system according to claim 1, wherein the display device is configured to control the one or more shared peripheral devices when the display device is not connected to the base device.

6. The system according to claim 1, wherein the display device is a tablet computing device.

7. The system according to claim 1, wherein, responsive to connection of the display device to the base device, control of the one or more shared peripheral devices is switched from the second operating system of the display device to the first operating system of the base device.

8. The system according to claim 1, wherein the higher bandwidth communication link operates according to a communication protocol selected from the group consisting of: a serial bus communication protocol, a peripheral component interconnect communication protocol, and a network connection communication protocol.

9. The system according to claim 8, wherein the connector further comprises a power connector connecting a power source of the base device to a battery of the display device; wherein the base device charges the battery of the display device via the power connector.

10. The system according to claim 1, further comprising a back plate extending from the base device and shaped to support the display device.

11. The system according to claim 1, wherein:
    the base device is configured to stop communications with the display device responsive to disconnection of the display device and the base device; and
    wherein the base device is configured to establish communications with the display device responsive to connection of the display device and the base device.

12. The system according to claim 1, wherein the display device is configured to enter a low power state responsive to connection to the base device.

13. A method comprising:
    sharing one or more peripheral devices between: a base device having one or more processors and a first operating system; and a display device having one or more processors, the one or more shared peripheral devices, and a second operating system;
    communicating information between the base device and the display device via one or more communication links; and
    switching control of the one or more shared peripheral devices from the display device to the base device responsive to connecting the display device to the base device; and
    wherein the one or more communication links comprise a wired connection providing: a low level communication link transmitting control communications between a controller in the base device and a controller in the display device; and a higher bandwidth communication link transmitting media file data between a processor of the base device and a processor of the display device.

14. The method according to claim 13, wherein the low level communication link operates using a first communication protocol.

15. The method according to claim 13, wherein the higher bandwidth communication link operates using a second communication protocol.

16. The method according to claim 13, wherein the one or more shared peripheral devices comprise one or more of: a camera, a display, a microphone, a speaker and a wireless antenna.

17. The method according to claim 13, further comprising controlling with the display device the one or more shared peripheral devices when the display device is not connected to the base device.

18. The method according to claim 13, wherein the display device is a tablet computing device.

19. The method according to claim 13, further comprising, responsive to connection of the display device to the base device, switching control of the one or more shared peripheral devices from the second operating system of the display device to the first operating system of the base device.

20. A computer program product comprising:
    a non-transitory computer readable storage device having computer readable program code embodied therewith, the computer readable program code comprising:
    computer readable program code configured to share one or more peripheral devices between: a base device having one or more processors and a first operating system; and a display device having one or more processors, the one or more shared peripheral devices, and a second operating system;
    computer readable program code configured to communicate information between the base device and the display device via one or more communication links; and
    computer readable program code configured to switch control of the one or more shared peripheral devices from the display device to the base device responsive to connecting the display device to the base device; and
    wherein the one or more communication links comprise a wired connection providing: a low level communication link transmitting, control communications between a controller in the base device and a controller in the display device; and a higher bandwidth communication link transmitting media file data between a processor of the base device and a processor of the display device.

* * * * *